United States Patent
Kawai et al.

(10) Patent No.: US 6,898,506 B2
(45) Date of Patent: May 24, 2005

(54) BRAKING FORCE CONTROL APPARATUS FOR VEHICLE AND METHOD THEREOF

(75) Inventors: Takashi Kawai, Susono (JP); Hiroshi Tsujii, Mishima (JP); Ken Kuretake, Mishima (JP); Masanori Sugiura, Toyota (JP); Hideto Hanada, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/392,187

(22) Filed: Mar. 20, 2003

(65) Prior Publication Data

US 2003/0191574 A1 Oct. 9, 2003

(30) Foreign Application Priority Data

Apr. 9, 2002 (JP) ........................................ 2002-107070

(51) Int. Cl.$^7$ .............................................. G06F 19/00
(52) U.S. Cl. .............................. 701/84; 701/22; 701/54; 701/70; 180/65.1; 180/711; 180/652; 60/706; 60/698; 477/205; 477/187
(58) Field of Search .............................. 701/22, 84, 54, 701/113, 36, 79, 70; 477/205, 187, 203, 3, 7; 180/65.1–65.6, 711, 852; 60/706, 698

(56) References Cited

U.S. PATENT DOCUMENTS

| 6,009,365 | A | | 12/1999 | Takahara et al. |
|---|---|---|---|---|
| 6,209,672 | B1 | * | 4/2001 | Severinsky ................. 180/65.2 |
| 6,216,465 | B1 | * | 4/2001 | Wakashiro et al. ............ 60/706 |
| 6,234,932 | B1 | * | 5/2001 | Kuroda et al. .................. 477/3 |
| 6,253,127 | B1 | * | 6/2001 | Itoyama et al. ................ 701/22 |
| 6,334,835 | B1 | * | 1/2002 | Tanaka et al. .............. 477/205 |
| 2002/0116099 | A1 | * | 8/2002 | Tabata et al. .................. 701/22 |

FOREIGN PATENT DOCUMENTS

| JP | A 11-164403 | 6/1999 |
|---|---|---|
| JP | A 11-191903 | 7/1999 |
| JP | A 2000-134713 | 5/2000 |
| JP | A 2000-255284 | 9/2000 |

* cited by examiner

Primary Examiner—Thomas G. Black
Assistant Examiner—Ronnie Mancho
(74) Attorney, Agent, or Firm—Oliff & Berridge, PLC

(57) ABSTRACT

The braking force control apparatus for a vehicle which has a function of applying a braking force to the vehicle by rotational resistance of the engine, by stopping the fuel supply to the engine during coasting of the vehicle and by controlling a torque capacity of a torque capacity control device that is provided between the engine and a wheel so that the torque capacity becomes equal to or higher than a predetermined value, and of decreasing the torque capacity of the torque capacity control device when a predetermined condition is satisfied, and has a function of applying the braking force to the vehicle by a function of an electric power generator which is coupled with the wheel such that power can be transmitted. The braking force control apparatus includes braking force control means which increases a braking force that is generated by the function of the electric power generator when the torque capacity of the torque capacity control device is decreased.

16 Claims, 3 Drawing Sheets

BRAKING FORCE CONTROL APPARATUS FOR VEHICLE AND METHOD THEREOF

INCORPORATION BY REFERENCE

The disclosure of Japanese Patent Application No. 2002-107070 filed on Apr. 9, 2002 including the specification, drawings and abstract is incorporated herein by reference in its entirety.

BACKGROUND OF THE INVENTION

1. Field of the Invention

The invention relates to an apparatus which controls braking force that is generated during coasting of a vehicle, and a method thereof.

2. Description of the Related Art

As related art of the invention, art for enhancing fuel economy by stopping a fuel supply in an area in which an engine rotational speed is equal to or higher than a predetermined value during coasting of a vehicle, more particularly, during deceleration has been known. An example of the art is disclosed in Japanese Patent Laid-Open Publication No. 2000-255284. In a control apparatus of a vehicle which is disclosed in this publication, a power transmission path is configured such that engine power is transmitted to a differential through a forward backward switching mechanism and a continuously variable transmission. Also, a torque converter and a lockup clutch are provided in parallel between an engine and the forward backward switching mechanism.

During deceleration of the vehicle, the lockup clutch is connected, and the fuel supply to the engine is cut off until a predetermined vehicle running state is realized. Then, when the predetermined vehicle running state is realized, the lockup clutch is disconnected, and the fuel supply is started. At the time of starting the fuel supply, an amount of fuel supply is controlled such that an engine output is increased and exceeds an idling maintaining output by a predetermined amount. By performing such control, a torque difference between before and after the disconnection of the lockup clutch can be reduced, and shock caused due to a change in vehicle speed can be decreased.

However, in the control apparatus disclosed in the above-mentioned publication, there is a problem that since an amount of the fuel supplied at the time of disconnecting the lockup clutch becomes larger than an amount of the fuel supplied at the idling time of the engine, fuel economy deteriorates.

SUMMARY OF THE INVENTION

The invention is made in order to solve the above-mentioned problem. It is an object of the invention to provide a braking force control apparatus and a braking force control method for a vehicle which can suppress an increase in an amount of fuel that is supplied to an engine when suppressing shock caused due to a change in vehicle speed.

In order to attain the above-mentioned object, a braking force control apparatus for a vehicle according to a first aspect of the invention has a function of applying a braking force to the vehicle by rotational resistance of the engine, by stopping the fuel supply to the engine during coasting of the vehicle and by controlling a torque capacity of a torque capacity control device which is provided between the engine and a wheel so that the torque capacity becomes equal to or higher than a predetermined value, and of decreasing the torque capacity of the torque capacity control device when a predetermined condition is satisfied, and has a function of applying the braking force to the vehicle by a function of an electric power generator which is coupled with the wheel such that power can be transmitted. The control apparatus further includes a braking force control device or a braking force control means which increases a braking force that is generated by the function of the electric power generator when the torque capacity of the torque capacity control device is decreased.

In this aspect, examples of increasing the braking force by the function of the electric power generator when the torque capacity of the torque capacity control device is decreased are increasing the braking force generated by the function of the electric power generator before the torque capacity is decreased, increasing the braking force generated by the function of the electric power generator during decreasing the torque capacity, increasing the braking force generated by the function of the electric power generator simultaneously with starting the decrease of the torque capacity, and the like. Also, as a principles of generating the braking force by the function of the electric power generator, regenerative braking, dynamic braking, negative phase braking, overcurrent braking and the like can be exemplified.

According to the first aspect, when the torque capacity of the torque capacity control device is decreased, although the braking force corresponding to the rotational resistance of the engine is decreased, the braking force generated by the function of the electric power generator is increased. Accordingly, a decrease in the total braking force, which is the sum of the braking force generated by the function of the engine and the braking force generated by the function of the electric power generator, is suppressed to the greatest extent possible.

In the first aspect, the braking force control device or the braking force control means may have a function of decreasing the braking force which is generated by the electric power generator with time. According to this function, the braking force generated by the electric power generator is decreased with time.

Also, in the first aspect, the braking force control device or the braking force control means may further include an estimation portion or an estimation means which estimates the total braking force when the torque capacity of the torque capacity control device is decreased and the braking force generated by the electric power generator is increased, and a fuel supply portion or a fuel supply means which determines the time for supplying fuel to the engine based on the estimation result of the estimation portion or the estimation means. According to this aspect, occurrence of a large change in the total braking force between before and after the torque capacity of the torque capacity control device is decreased can be suppressed.

Further, the braking force control device or the braking force control means may further include a comparison portion or a comparison means which compares the total braking force estimated by the estimation portion or the estimation means with the total braking force before the torque capacity of the torque capacity control device is decreased. The fuel supply portion or the fuel supply means may further have a function of supplying fuel to the engine based on the result of the comparison between the total braking force estimated by the estimation portion or the estimation means and the total braking force before the torque capacity of the torque capacity control device is decreased, before decreasing the torque capacity of the torque capacity control device.

The invention is not limited to the braking force control device of the first aspect, but is also applicable to vehicles equipped with the braking force control device as described above, and to a control method thereof.

According to the aspect, occurrence of a large change in the total braking force between before and after the torque capacity of the torque capacity control device is decreased can be suppressed with further reliability

DETAILED DESCRIPTION OF THE PREFERRED EMBODIMENTS

Figure 2:
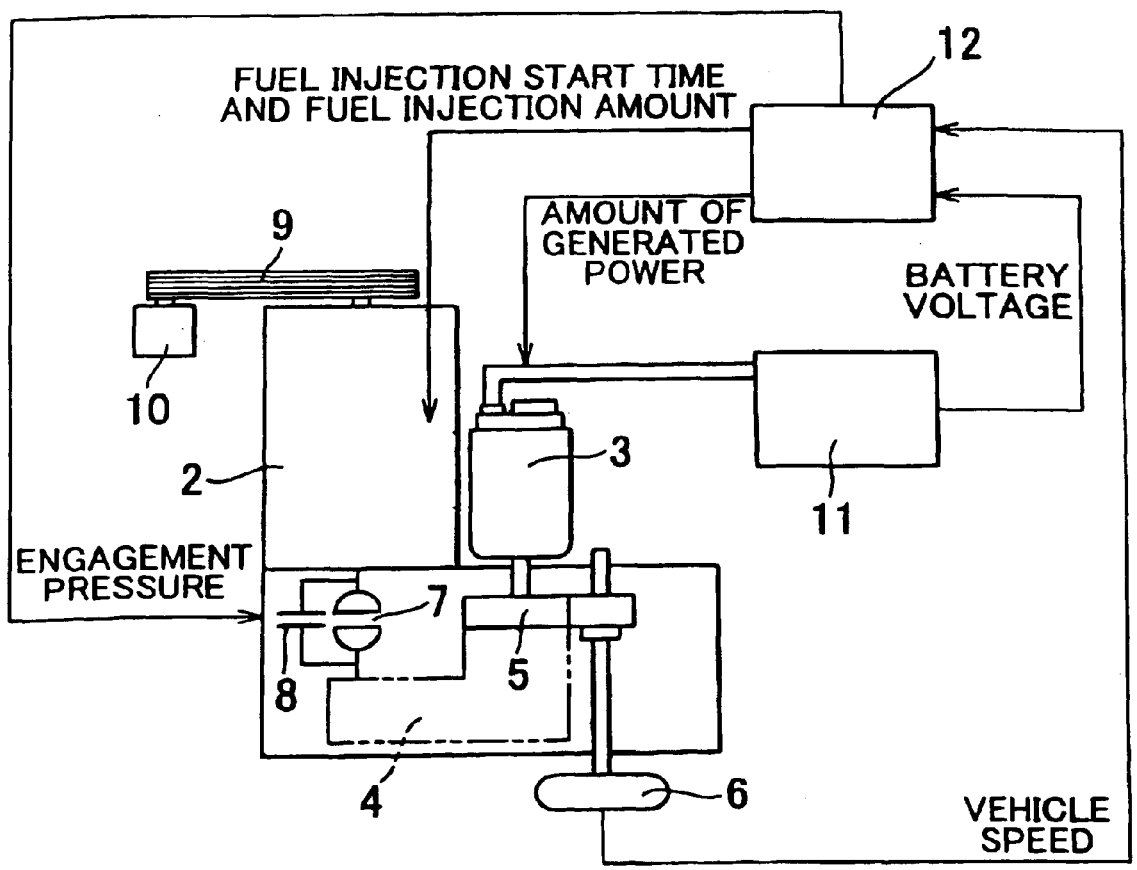
FIG. 2 is a conceptual diagram showing an example of a configuration of a vehicle to which an example of control in FIG. 1 can be applied.

Next, an embodiment according to the invention will be described. FIG. 2 is a conceptual diagram showing configurations of a power train, an electric system and a control system of a vehicle 1 to which the invention is applied. The configuration of the power train of the vehicle 1 will be initially described. The vehicle 1 includes an engine 2 and a motor-generator 3 as a driving force source. The engine 2 is a power unit which outputs power by fuel combustion. As the engine 2, for example, an internal combustion engine, more particularly, a gasoline engine, a diesel engine, an LPG engine or the like, can be employed. A transmission 4 is provided on an output side of the engine 2, and a rotating member 5 of the transmission 4 is coupled with a wheel 6 such that power can be transmitted. Also, the motor-generator 3 is coupled with the rotating member 5 such that power can be transmitted. The motor-generator 3 has a powering function of transforming electric energy to kinetic energy, and a regenerative function of transforming kinetic energy to electric energy.

In addition, a fluid transmission device 7 and a lockup clutch (L/U) 8 are provided in parallel in a power transmission path between the transmission 4 and the engine 2. Also, as an actuator which controls the torque capacity of the lockup clutch 8, that is, an engagement pressure of the lockup clutch 8, for example, a hydraulic control device (not shown) is provided.

Next, the electric system of the vehicle 1 will be described. An alternator 10 is connected to a crank shaft (not shown) of the engine 2 through a transmission device 9. Also, the motor-generator 3 is connected to a capacitor 11, and the capacitor 11 can be charged with electric power generated by the motor-generator 3.

Then, the control system which controls the entire vehicle 1 will be described. An electronic control unit (ECU) 12 is provided, and an acceleration request and a braking request, a vehicle speed, a voltage of the capacitor 11 and the like are determined by the electronic control unit 12. Also, the injection amount and the injection timing of the fuel which is supplied to the engine 2, the torque capacity of the lockup clutch 8 and the like are controlled by the electronic control unit 12. Accordingly, a map which controls the torque capacity of the lockup clutch 8, more specifically, engagement, disengagement, and slip of the lockup clutch 8 is stored. This map controls the lockup clutch 8 based on a vehicle running state, for example, parameters such as an acceleration request and a vehicle speed.

Next, control of the vehicle 1 will be described. First, when fuel is supplied to the engine 2, and torque is output by fuel combustion, the engine torque is transmitted to the wheel 6 through the transmission 4 and driving force is generated. Also, when the electric power of the capacitor 11 is supplied to the motor-generator 3 and the motor-generator 3 is driven as an electric motor, the torque of the motor-generator 3 is transmitted to the wheel 6. The vehicle 1 is a so-called hybrid vehicle which can use at least one of the engine 2 and the motor-generator 3 as a driving power source. It is also possible to supply part of the engine torque such that the motor-generator 3 functions as an electric power generator using the torque.

Further, during coasting of the vehicle 1, the kinetic energy of the wheel 6 is transmitted to the engine 2 through the transmission 4, and the braking force due to rotational resistance of the engine 2, that is, the engine braking force is applied to the vehicle 1. Also during coasting of the vehicle 1, when the engine rotational speed is equal to or higher than a predetermined value, control for stopping the fuel supply to the engine 2, that is, so-called fuel cut control can be performed. When the engine rotational speed becomes lower than the predetermined value during performing the fuel cut control, the fuel supply to the engine 2 is started.

Also, during coasting of the vehicle 1, the kinetic energy of the wheel 6 can be transmitted to the motor-generator 3 so as to make the motor-generator 3 function as an electric power generator. When the motor-generator 3 is made to function as an electric power generator using the kinetic energy of the wheel 6, the braking force corresponding to power generating ability, that is, the regenerative braking force is applied to the vehicle 1. Further, when the lockup clutch 8 is engaged, power transmission is performed between the engine 2 and the transmission 4 by friction. Meanwhile, when the lockup clutch 8 is disengaged, power transmission is performed by kinetic energy of a fluid.

Next, an example of control which is performed during coasting of the vehicle 1 will be described with reference to a flowchart in FIG. 1. In this example of control, the control of the lockup clutch 8, the control of the motor-generator 3 and the control of the fuel supply to the engine 2 are coordinated. First, in step S1, the vehicle 1 is coasting, the lockup clutch 8 is engaged, and the fuel cut control is performed. In step S1, when there is no acceleration request any more, for example, when an accelerator opening becomes full open, it is determined that the vehicle 1 is coasting. The vehicle speed during coasting is affected by the inclination of a road. Although deceleration, constant speed and acceleration can be exemplifies as speed types, deceleration is taken as an example in the following description.

Following step S1, it is determined whether the present vehicle speed is slightly higher than the vehicle speed at which the lockup clutch 8 is disengaged (step S2). When a negative determination is made in step S2, the process in S2 is repeated. When an affirmative determination is made in step S2, the regenerative braking power when the motor-generator 3 is made to function as an electric power generator, that is, the regenerative braking torque is calculated based on the voltage of the capacitor 11 and the vehicle speed (step S3).

Namely, since the amount of the electric power generated by the motor-generator 3 is dependent on the charging state of the capacitor 11, the voltage of the capacitor 11 is used as one of the parameters for calculating the regenerative braking torque. Also, since the amount of the electric power generated by the motor-generator 3 is dependent on the rotational speed of the motor-generator 3, the rotational speed of the motor-generator 3 is used as one of the parameters for calculating the regenerative braking torque. The rotational speed of the motor-generator 3 is indirectly obtained based on a vehicle speed. However, when a resolver or the like for directly detecting the rotational speed of the motor-generator 3 is provided, the rotational speed may be calculated using the detection signal.

In step S4 subsequent to step S3, the following control is performed. First, a comparison is made between the total braking force of the vehicle 1 which is generated before the lockup clutch 8 is disengaged and the total braking force (estimated value) of the vehicle 1 after the lockup clutch 8 is disengaged, based on the result of calculation that is obtained in step S3. The total braking force is the sum of the braking force corresponding to the engine braking force and the braking force generated by the function of the motor-generator 3. Also, when it is estimated that the total braking force of the vehicle 1 after the lockup clutch 8 is disengaged is lower than the total braking force of the vehicle 1 which is generated before the lockup clutch 8 is disengaged as a result of the comparison, the fuel supply to the engine 2 is started before the lockup clutch 8 is disengaged (step S5).

Following the above-mentioned step S5, the lockup clutch 8 is disengaged (step S6), and the regenerative control is performed by the motor-generator 3 (step S7), after which this control routine ends. When the fuel injection is not started in step S5, the fuel injection is started in step S7. When the regenerative braking force of the motor-generator 3 is generated before step 57, more specifically, before the lockup clutch 8 is disengaged, control for increasing the regenerative braking force needs to be performed in step S7.

Figure 3:
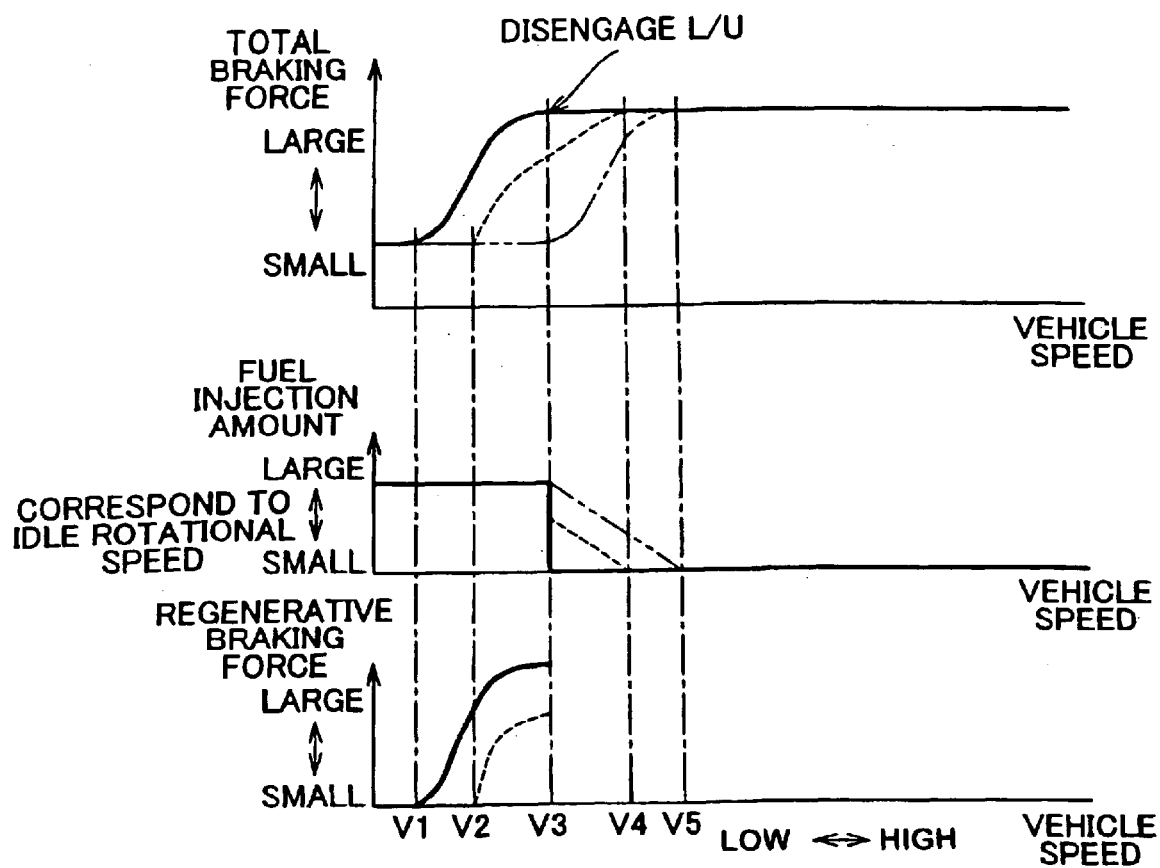
FIG. 3 is a characteristic diagram which corresponds to the example of control in FIG. 1.

FIG. 3 is a diagram showing a correspondence relation between the total braking force, the fuel injection amount and the regenerative braking force which are applied to the vehicle 1, and the vehicle speed. In FIG. 3, the lockup clutch 8 is disengaged at a vehicle speed V3. In FIG. 3, the fuel injection amount and the total braking force are described at each regenerative braking force which can be generated by the function of the motor-generator 3.

First, a first case where it is determined in the above-mentioned step S3 that the regenerative braking force that can be generated by the motor-generator is high will be described. In the first case, during deceleration running of the vehicle, when the present vehicle speed is higher than the vehicle speed V3, fuel injection is stopped. Also, the regenerative braking force is not generated. Namely, the total braking force is maintained to be substantially constant by the engine braking force. Then, when the present vehicle speed becomes equal to or lower than the vehicle speed V3, the fuel injection is started, and the regenerative braking force by the motor-generator 3 is generated as shown by a solid line. The regenerative braking force is decreased with a decrease in the vehicle speed, and becomes zero at the vehicle speed V1. By such control, when the vehicle speed is equal to or lower than the vehicle speed V3, the total braking force is decreased with a decrease in the vehicle speed, as shown by a solid line, and is controlled to become a predetermined value at the vehicle speed V1. The fuel injection amount when the vehicle speed is equal to or lower than the vehicle speed V3 corresponds to the fuel injection amount which is required such that the engine rotational speed is maintained at the idle rotational speed.

Next, a second case where it is determined in the above-mentioned step S4 that the regenerative braking force that can be generated by the motor-generator 3 is lower than that in the first case will be described. In the second case, the fuel injection is started from when the present vehicle speed is decreased to the vehicle speed V4. Also, the regenerative braking force is not generated. Then, the total braking force is decreased, as shown by a dashed line, as the vehicle speed is decreased from the vehicle speed V4 at which the fuel injection is started. Then, the present vehicle speed becomes equal to or less than the vehicle speed V3, the fuel injection amount is controlled to be a value corresponding to the idle rotational speed, and the regenerative braking force is generated by the motor-generator 3 as shown by a dashed line. The regenerative braking force is decreased with a decrease in the vehicle speed and becomes 0 at the vehicle speed V2. When the regenerative braking force in the first case is compared with regenerative braking force in the second case, which correspond to the same vehicle speed, the regenerative braking force in the second case shown by a dashed line is lower (weaker) than the regenerative force in the first case shown in a solid line. By such control, when the vehicle speed is equal to or lower than the vehicle speed V4, the total braking force is decreased with a decrease in the vehicle speed, as shown by a dashed line.

A case where it is determined in step S4 that the regenerative braking force cannot be generated by the motor-generator 3 will be described. In this case, the fuel injection is started when the present vehicle speed is decreased to the vehicle speed V5, as shown by a three-point chain line. In this case, the vehicle speed V5 is higher than the vehicle speed V4. Then, the total braking force is decreased as the vehicle speed is decreased from the vehicle speed V5 at which fuel injection is started, as shown by a three-point chain line. When the present vehicle speed becomes equal to or lower than the vehicle speed V3, the fuel injection amount is controlled to be at the value corresponding to the idle rotational speed, and the total braking force is maintained at the substantially constant predetermined value. The relation among vehicle speeds in FIG. 3 and a description thereof is as follows; vehicle speed V5>vehicle speed V4>vehicle speed V3>vehicle speed V2>vehicle speed V1. The predetermined vehicle speed which is described in step S2 is a vehicle speed equal to or higher than the vehicle speed V5 shown in FIG. 3.

Figure 1:
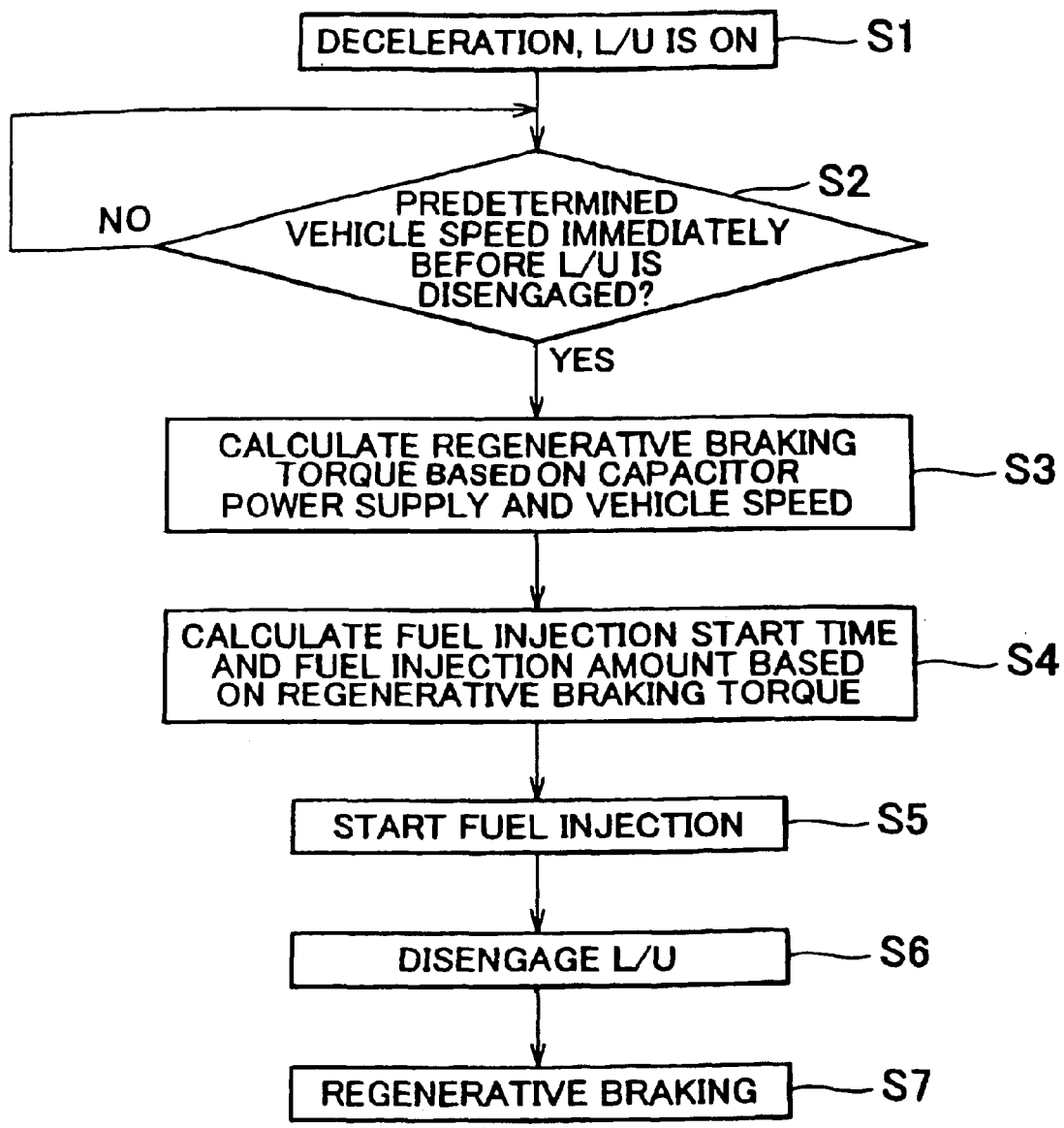
FIG. 1 is a flowchart showing an example of control according to the invention.

According to control in FIG. 1 and FIG. 2, when the lockup clutch 8 is disengaged, power is transmitted between the engine 2 and the transmission 4 by the kinetic energy of fluid, and the engine braking force is decreased. However, the regenerative braking force of the motor-generator 3 is increased. Accordingly, a decrease in the total braking force that is applied to the vehicle 1 is suppressed to the greatest extent possible, and occurrence of shock due to a rapid change in the vehicle speed can be suppressed. Also, in the first case where it is estimated in step S4 that the regenerative braking force which is generated by the motor-generator 3 is high, it is not necessary to start the fuel injection before the lockup clutch 8 is disengaged. Accordingly, fuel economy can be enhanced.

The regenerative braking force is generated by the motor-generator 3, and the generated electric power is stored in the capacitor 11. Accordingly, the opportunities of transmitting part of the power of the engine 2 to the motor-generator 3 or to the alternator 10 and storing the generated electric power in the capacitor 11 in order to increase the amount of electric power stored in the capacitor 11 can be decreased to the greatest extent possible. Accordingly, fuel economy can be further enhanced.

Further, when it is estimated in step S4 that the total braking force of the vehicle 1 after the lockup clutch 8 is disengaged is lower than the total braking force of the vehicle 1 which is generated before the lockup clutch 8 is disengaged, the fuel supply to the engine 2 is started before the lockup clutch 8 is disengaged. Accordingly, occurrence of a large change in the total braking force between before and after the lockup clutch 8 is disengaged can be suppressed. Accordingly, the shock suppressing function is further enhanced.

The relation between functional means shown in FIG. 1 and the configuration of the invention will be described as follows; step S1, step S2, step S3, step S4, step S6, step S7 correspond to braking force control means of the invention, step S4 corresponds to estimation means of the invention, and step S5 corresponds to fuel supply means and comparison means of the invention.

In the vehicle 1 shown in FIG. 2 includes a power train which is configured such that both the engine 2 and the motor-generator 3 can transmit power to the same wheel 6. However, the example of control in FIG. 1 can be applied to a vehicle (not shown) in which the power train is configured such that the wheel with which the engine is coupled such that power can be transmitted and the wheel with which the motor-generator is coupled are different. Also, the example of control in step S1 can be applied to the power train which is configured such that the motor-generator is provided in the power transmission path between the transmission and the wheel.

Further, the power train shown in FIG. 2 is configured such that the torque capacity of the lockup clutch which is provided in parallel with the fluid transmission device is decreased. However, the power train may be configured such that the fluid transmission device is not provided between the engine and the transmission. Namely, the power train may be provided with a clutch which is referred to as a take-off clutch or an automatic clutch, instead of a lockup clutch.

Further, in the power train provided with a torque transmission member in which the torque capacity is adjusted in order to control the ratio of the rotational speed between an input member of the transmission and an output member of the transmission, that is, the transmission gear ratio, when the torque capacity of the torque transmission member is decreased, the total braking force of the vehicle may be controlled by the function of the motor-generator. Examples of such torque transmission members are a frictional engagement device of a continuously variable transmission, a pulley and a wrapping transmission member of a belt-type continuously variable transmission, an output disk and a power roller of a toroidal type continuously variable transmission, and the like.

In the embodiment, the configuration is made such that the electric power of the motor-generator 3 is stored in the capacitor 11. However, the configuration may be made such that the electric power of the motor-generator 3 is stored in a power storing device other than the capacitor 11, for example, in a battery. In addition, in the examples of control shown in FIG. 1 and FIG. 3, a case where the total braking force is adjusted by the regenerative braking of the motor-generator 3. However, the total braking force can be adjusted by applying a brake to the motor-generator 3 by another principle, such as dynamic braking, negative phase braking, or overcurrent braking.

The correspondence relation between the items described in the embodiment and the items described in each claim is as follows; the engine 2 corresponds to an engine according to the invention, the lockup clutch 8, the automatic clutch, the take-off clutch, the torque transmission member of the transmission and the like correspond to the torque capacity control device according to the invention, the engagement state of the lockup clutch 8 corresponds to a state in which "torque capacity of the torque capacity control device is controlled to be equal to or higher than a predetermined value" according to the invention, disengaging the engaged lockup clutch 8 corresponds to "decreasing the torque capacity of the torque capacity control device" according to the invention, the predetermined accelerator opening and the vehicle speed V3 which are defined in the map correspond to the predetermined condition according to the invention, the motor-generator 3 corresponds to the electric power generator according to the invention, the braking force generated by regenerative braking, power generation braking, negative phase braking, overcurrent braking and the like corresponds to "the amount of braking force generated by the function of the electric power generator" according to the invention, and the sum of the braking force generated by the rotational resistance of the engine 1 and the braking force generated by the function of the motor-generator 3 corresponds to the total braking force according to the invention.

The controllers (e.g., the electronic control units 12) of the illustrated exemplary embodiments are implemented as one or more programmed general purpose computers. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the invention are shown in various combinations and configurations, which are exemplary, other combinations and configurations, including more less or only a single element, are also within the spirit and scope of the invention.

What is claimed is:

1. A braking force control apparatus for a vehicle, comprising:
    an engine;
    a fuel supply control device which controls a fuel supply to the engine during coasting of the vehicle;
    a torque capacity control device which is provided between the engine and a wheel, and which controls a torque capacity between the engine and the wheel;

an electric power generator that is coupled with the wheel such that power can be transmitted; and a braking force control device which applies to the vehicle a braking force through rotational resistance of the engine, by stopping the fuel supply to the engine during coasting of the vehicle and by controlling the torque capacity so that the torque capacity becomes equal to or higher than a predetermined value, and which decreases the torque capacity and increases a braking force generated by the electric power generator when a predetermined condition is satisfied, wherein, when the torque capacity is decreased, the braking force control device increases the braking force generated by the electric power generator compared with a braking force generated by the electric power generator which is obtained before or when the torque capacity is decreased.

2. The control apparatus according to claim 1 wherein, the braking force control device decreases the braking force generated by the electric power generator with time.

3. The control apparatus according to claim 1, further comprising:

an estimation portion which estimates a total braking force when the torque capacity of the torque capacity control device is decreased, and the braking force generated by the electric power generator is increased; and a fuel supply portion which determines time for supplying the fuel to the engine based on a result of estimation obtained by the estimation portion.

4. The control apparatus according to claim 3, further comprising:

a comparison portion which compares the total braking force that is estimated by the estimation portion with a total braking force before the torque capacity of the torque capacity control device is decreased, wherein the fuel supply portion starts the fuel supply to the engine based on a result of a comparison between the total braking force that is estimated by the estimation portion and the total braking force before the torque capacity of the torque capacity control device is decreased, before the torque capacity of the torque capacity control device is decreased.

5. The control apparatus according to claim 1, wherein a regenerative braking force is included in the braking force generated by a function of the electric power generator.

6. The control apparatus according to claim 1, wherein the torque capacity control device is a torque converter with a lockup clutch which is engaged or disengaged such that torque transmission between the engine and the wheel is mechanically connected or cut off, and the braking force control device stops the fuel supply to the engine during coasting of the vehicle by the fuel supply control device, engages the lockup clutch so as to apply the braking force to the vehicle by the rotational resistance of the engine, and when the predetermined condition is satisfied, the braking force control device disengages the lockup clutch and increases the braking force generated by the electric power generator.

7. The control apparatus according to claim 1, wherein the braking force control device suppresses a decrease in the total braking force, which is a sum of the braking force by the rotational resistance of the engine and the braking force generated by the electric power generator, by increasing the braking force generated by the electric power generator when the predetermined condition is satisfied.

8. The control apparatus according to claim 1, wherein the predetermined condition includes a case where a vehicle speed becomes equal to or lower than a predetermined value.

9. A braking force control apparatus for a vehicle, comprising:

an engine;

a fuel supply control means for controlling a fuel supply to the engine during coasting of the vehicle;

a torque capacity control means which is provided between the engine and a wheel, and for controlling a torque capacity between the engine and the wheel;

an electric power generator that is coupled with the wheel such that power can be transmitted; and a braking force control means for applying to the vehicle a braking force through rotational resistance of the engine, by stopping the fuel supply to the engine during coasting of the vehicle and by controlling the torque capacity so that the torque capacity becomes equal to or higher than a predetermined value, and which decreases the torque capacity and increases a braking force generated by the electric power generator when a predetermined condition is satisfied, wherein, when the torque capacity is decreased, the braking force control device increases the braking force generated by the electric power generator compared with a braking force generated by the electric power generator which is obtained before or when the torque capacity is decreased.

10. The control apparatus according to claim 9 wherein, the braking force control means decreases the braking force generated by the electric power generator with time.

11. The control apparatus according to claim 9, further comprising:

an estimation means for estimating a total braking force when the torque capacity of the torque capacity control means is decreased, and the braking force generated by the electric power generator is increased; and a fuel supply means for determining time for supplying the fuel to the engine based on a result of estimation obtained by the estimation means.

12. The control apparatus according to claim 11, further comprising:

a comparison means for comparing the total braking force that is estimated by the estimation means with a total braking force before the torque capacity of the torque capacity control means is decreased, wherein the fuel supply means starts the fuel supply to the engine based on a result of a comparison between the total braking force that is estimated by the estimation means and the total braking force before the torque capacity of the torque capacity control means is decreased, before the torque capacity of the torque capacity control means is decreased.

13. A method of controlling a braking force of a vehicle which includes a torque capacity control device that is provided between an engine and a wheel, and an electric power generator that is coupled with the wheel such that power can be transmitted, comprising:

applying to the vehicle a braking force through rotational resistance of the engine, by stopping fuel supply to the engine during coasting of the vehicle and by controlling a torque capacity of the torque capacity control device so that the torque capacity becomes equal to or higher than a predetermined value, and decreasing the torque capacity of the torque capacity control device and increasing a braking force generated by the electric power generator when a predetermined condition is satisfied, wherein, when the torque capacity is decreased, the braking force control device increases the braking force generated by the electric power generator compared with a braking force generated by the electric power generator which is obtained before or when the torque capacity is decreased.

14. The control method according to claim 13, wherein the braking force generated by the electric power generator is decreased with time.

15. The control method according to claim 13, further comprising the steps of:

decreasing the torque capacity of the torque capacity control device, and estimating a total braking force when the braking force generated by the electric power generator is increased, and determining time for supplying the fuel to the engine based on a result of the estimation.

16. The control method according to claim 15, further comprising the step of:

comparing the estimated total braking force with a total braking force before the torque capacity of the torque capacity control device is decreased, wherein the determination portion determines the fuel supply to the engine based on a result of the comparison between the estimated total braking force and the total braking force before the torque capacity of the torque capacity control device is decreased, before the torque capacity of the torque capacity control device is decreased.

* * * * *